UNITED STATES PATENT OFFICE.

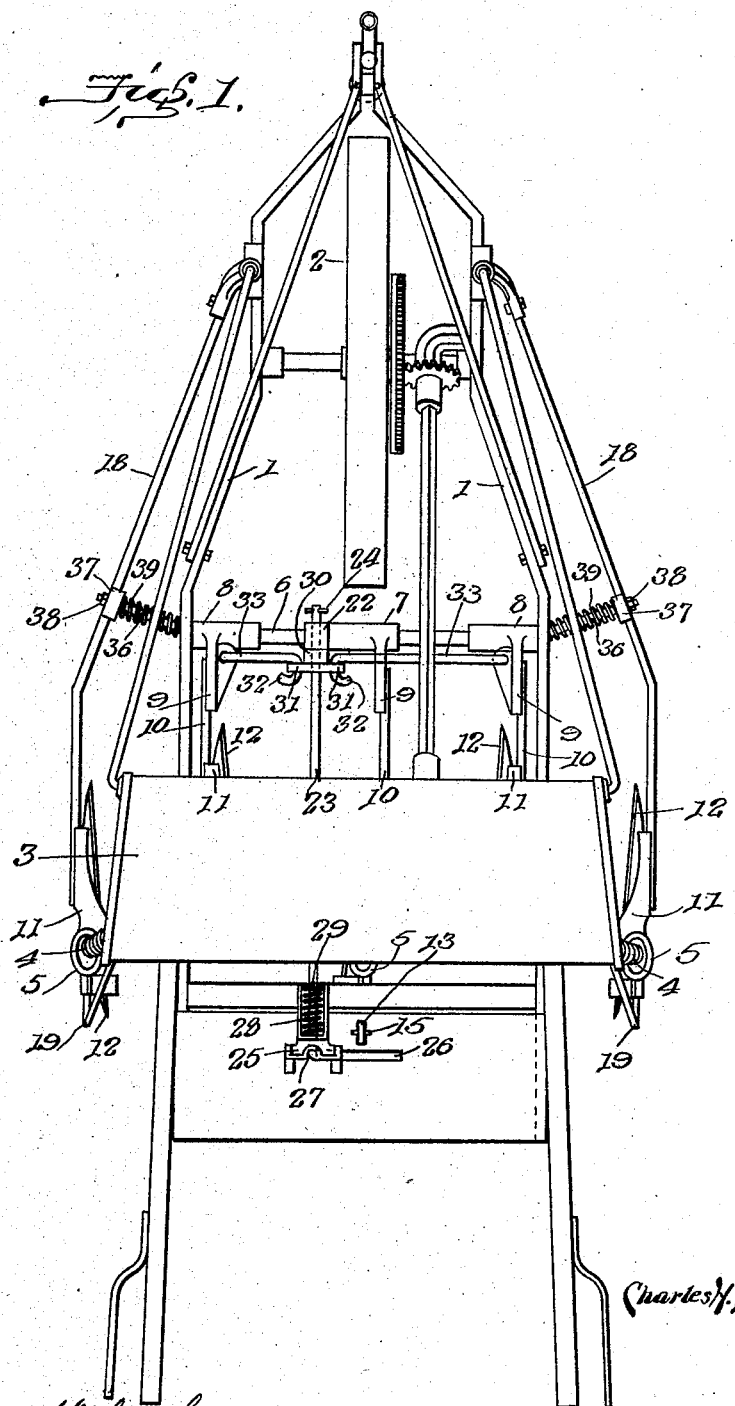

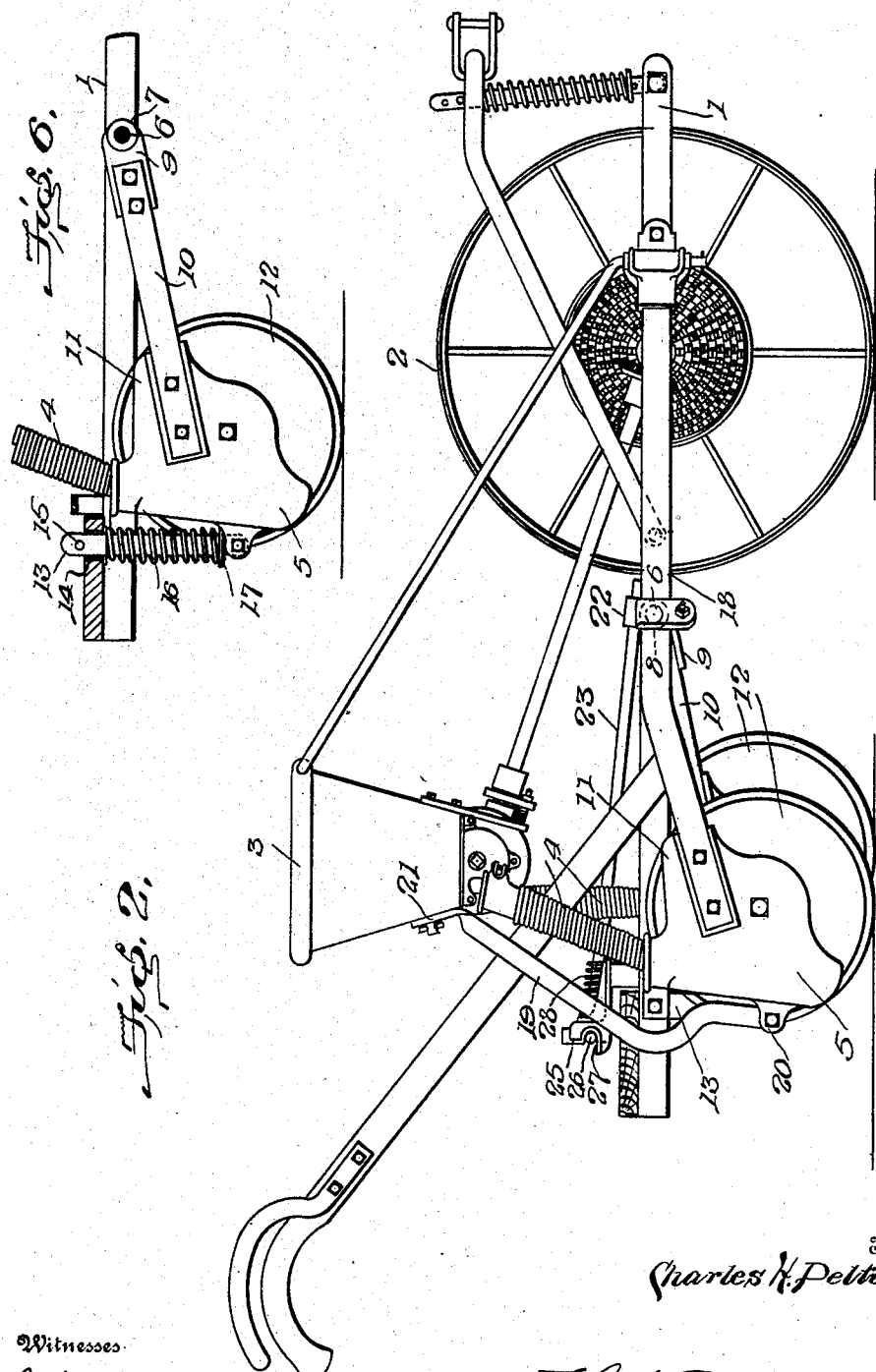

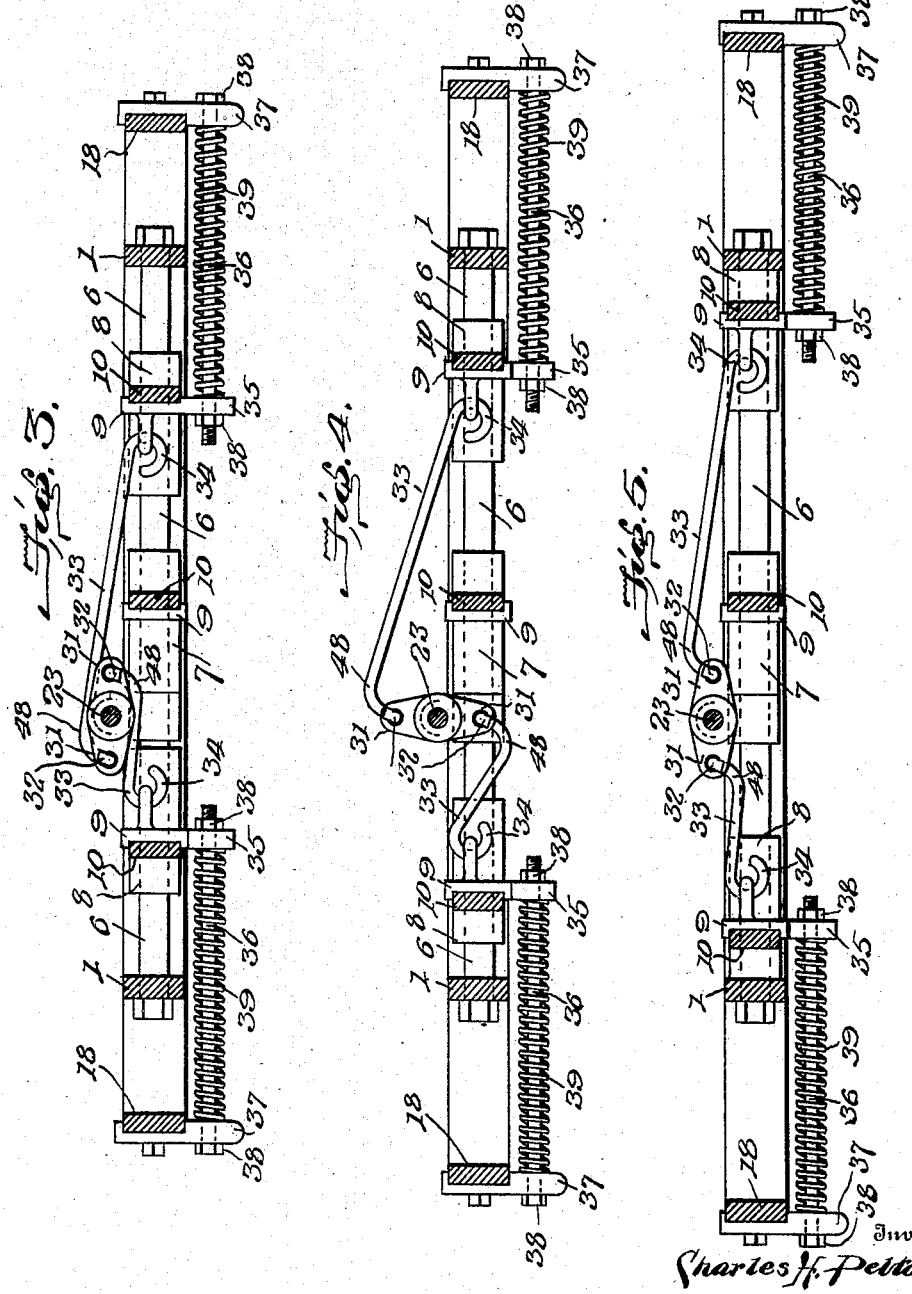

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

DISK DRILL.

No. 911,259.        Specification of Letters Patent.        Patented Feb. 2, 1909.

Application filed March 4, 1907. Serial No. 360,458.

*To all whom it may concern:*

Be it known that I, CHARLES H. PELTON, a citizen of the United States, residing at Springfield, in the county of Clark and State of Ohio, have invented certain new and useful Improvements in Disk Drills, of which the following is a specification, reference being had therein to the accompanying drawings.

The present invention relates to disk drills and has for its object the production of a drill of this character in which the disks can be adjusted transversely of the machine to vary the distance between the several disks and thereby vary the distance between the rows of grain planted; the provision of mechanism whereby the adjusting of the disks may be accomplished simultaneously and from a convenient point in the rear of the drill; and the provision of means whereby the disks will all be maintained in proper relation with the ground regardless of irregularities therein.

With these objects in view my invention consists in certain novel features of construction to be hereinafter described, and then more fully pointed out in the claims.

In the accompanying drawings, Figure 1 is a top plan view of a drill embodying my invention; Fig. 2 is a side elevation of the same; Figs. 3, 4 and 5 are detail sectional views showing the adjusting mechanism in its several positions; and Fig. 6 is a detail view of one of the disks and its supporting mechanism.

In these drawings, I have illustrated my invention as applied to a five disk drill of ordinary construction, but, obviously, the invention can be adapted for use in connection with any drill of this general type. The drill, as here shown, consists of the main frame 1, having the traction wheel 2 journaled near the forward end thereof and provided at its rear end with a seed hopper 3 mounted above the frame and provided with flexible seed tubes 4 which connect the hopper with the boots 5. The guide bar or shaft 6 is mounted transversely of the frame 1 intermediate its ends and has mounted thereon a plurality of supports or sleeves, preferably three in number, the central sleeve 7 being journaled on the shaft 6 and held against longitudinal movement thereon, while the two outer sleeves 8 are journaled on the shaft 6 and are free to move longitudinally thereof. The sleeves are similar in construction and each has a rearwardly projecting arm or bracket 9, to which is secured one end of the drag bar 10, to the opposite end of which is secured the bracket 11 carrying the boot 5 and the disk 12. These disks are free to move vertically to a limited extent. Each supporting bracket 11 is provided with an upwardly extending rod 13 pivotally connected thereto, and, in the present instance, this rod is shown as pivotally connected to the boot 5 carried by the bracket 11. The rods 13 extend upwardly through guideways 14 in the frame 1 and are provided at their upper ends with a stop, such as the key 15, to prevent their withdrawal from the guideway. A spring 16 is coiled about the rod 13 and is confined between the frame and a suitable stop near the lower end of the rod, such as the washer and split key 17. The drag bars 18 for the two outer disks are of much greater length than the drag bars 10 and are pivoted to the frame near the forward end thereof and adapted to swing in a horizontal plane. These drag bars extend toward the rear of the drill to a point substantially in alinement with the rear ends of the drag bars 10 and are there provided with the bracket 11, boot 5 and disk 12, as are the drag bars 10. The rear ends of the drag bars 18 are connected with the main frame by a bar 19, which is connected to the boot at 20 and pivotally connected to the hopper at 21. The pivotal connection of the bar 19 to the hopper is such as to allow the boot and disk to move laterally, but to hold the same against movement in a vertical plane.

The central sleeve 7, which is mounted on the shaft 6, is provided with an upwardly extending bearing lug 22, extending transversely of the shaft 6 and adapted to receive a rod or shaft 23 which is mounted to slide longitudinally thereof and to rotate therein, and is provided with a stop, such as a split key 24, to prevent its withdrawal from the bearing lug. The bar 23 extends to the rear of the machine beyond the feed hopper where it extends through an apertured guide 25 and has its rear end bent at right angles to the main portion thereof to form a handle 26. The guide 25 is provided in its rear face with a series of recesses 27, preferably placed at intervals of ninety (90) degrees and adapted to receive the handle 26 and hold the same against lateral movement. A spring 28 is coiled about the rod 23 and confined between the front wall of the guide 25 and a suitable stop on the rod 23, such as the washer and split key 29. This spring serves to hold the rod normally in its foremost position with the handle 26 in one of the recesses 27, thereby preventing the rotation of the rod 23 about its longitudinal axis.

A collar 30 is mounted on the rod 23 near the shaft 6 and is so connected thereto as to rotate with the rod, but to allow the same a free longitudinal movement relatively thereto. The collar 30 is provided with oppositely extending apertured arms 31, adapted to receive the pivot lugs 32 of the connecting rods 33, the pivot lugs, in the present instance, being formed by turning the inner ends of the rods at right angles thereto and inserting these end portions through the apertures of the arms 31. The opposite ends of the rods are pivotally connected to the brackets 9 of the outer sleeves 8, preferably by turning the outer ends of the rods 33 to form hooks 34, which extend through apertures formed in the brackets 9. The outer sleeves 8 are provided on their lower sides with apertured lugs or eyes 35, adapted to receive the adjacent ends of the rods 36, the opposite ends of which extend through similar apertured lugs or eyes 37 carried by the drag bars 18. These rods are provided on their outer ends with nuts 38 to prevent their withdrawal from their respective bearing lugs and may be held in their relative positions to the several drag bars in any suitable manner, but I prefer to accomplish this by means of a spring 39 coiled about the rod 6 and confined between the apertured lugs 35 and 37 and serving to hold the drag bars 18 normally in their extended position, but allowing a limited lateral movement of the same.

The operation of the device will be obvious from the foregoing description. With the adjusting mechanism in its normal position, that is, with the crank arms 31 in the position shown in Figs. 1 and 5, the drag bars are in their most widely separated position and the rows planted are separated by the widest possible space. By grasping the handle 26 of the rod 23 and moving the same rearwardly against the compression of the spring 28 until it is released from the recess 27 and then turning the same through an arc of ninety (90) degrees and allowing it to engage the next recess 27, the arms 31 will be turned to a position at right angles to the position which they formerly occupied, as shown in Fig. 4, thereby moving the sleeves 8 toward the central sleeve 7 and, consequently, the disks carried by such sleeves toward the disk carried by the central sleeve 7 and lessening the distance between the same an equal amount. The drag bars 18 being pivoted to the frame at a point considerably beyond the ends of the drag bars 10 and connected to the sleeves 8 at a point adjacent thereto, will be caused to move in unison with the sleeves 8 and the drag bars will be moved at the point of their connection with the sleeves a distance equal to the distance which the sleeves move, and, as this point is considerably in the rear of the disks carried by the drag bars, the disks will move through a considerably greater distance than do the central portions of the drag bars. Thus by making the connections between the drag bars 18 and the sleeves 8 at the proper distance from the rear ends of the drag bars the disks carried by these drag bars can be caused to move twice the distance which the disks connected to the sleeves 8 are caused to move, thus maintaining the same distance between the disks connected to the drag bars 18 and the disks connected to the sleeves 8 as is maintained between these latter disks and the disks carried by the central sleeve 7. By moving the handle 26 to rotate the shaft 23 through a further arc of ninety (90) degrees, the crank arms 31 are moved to a position the reverse of that which they originally occupied, as shown in Fig. 3. the rods 33 being bent outwardly at 48 to allow them to pass around the shaft 23 and permit the arms 31 to assume a horizontal position, thus moving the drag bars to their innermost position and adjusting the distance between the disks and the rows planted thereby to the narrowest possible space. Further, it will be apparent that the adjustment of all the disks is accomplished simultaneously by the operation of but a single lever or handle and that this adjustment is positive and necessarily unvarying. The disks carried by the drag bars 18 being held against vertical movement while the intermediate disks are permitted to move vertically, provides what is practically a three point support for the drill, the traction wheel 2 serving as the forward support and the disks carried by the drag bars 18 serving for the other two supports. This construction is such that the disks will all be in operative engagement with the ground at all times regardless of any irregularities therein and this result will be accomplished without affecting the stability and the steering qualities of the drill. The traction wheel serves as a point of pivotal support for the frame and the two outer disks are held in positive engagement with the ground, while the inner disks are capable of vertical movement, as above described, and, should any irregularities occur in the ground intermediate the outer disks, these intermediate disks will rise or fall to accommodate themselves to this irregularity, and, in the case of a depression in the ground, will sink to the lower surface thereof and properly plant the grain, while in the case of an elevation they will ride over the same without tilting the frame of the machine and thereby raising the outer disks out of engagement with the ground, as is the case where the intermediate disks are rigidly secured to the frame. Likewise, when one of the outer disks comes in contact with an elevation, the intermediate disks are not raised out of engagement with the ground, but are held in operative engagement therewith by their springs, and, as stated, this result is accomplished without affecting the stability of the machine, as is the case where all the disks are spring mounted, as such a construction causes the machine to wabble badly and renders the steering thereof a very difficult matter.

I wish it to be understood that I do not desire to be limited to the exact details of construction shown and described, for obvious modifications will occur to a person skilled in the art.

Having thus fully described my invention, what I claim as new and desire to secure by Letters Patent, is:—

1. In a device of the character described, the combination, with a frame, a guide bar extending transversely of said frame, a support mounted near the center of said guide bar and held against movement longitudinally thereof, supports mounted on either side of said central support and adapted to move longitudinally of said guide bar, and disks connected to said supports, of a shaft rotatably mounted on said frame, movable longitudinally thereof, connected at one end to said movable supports and extending to a point near the rear of said frame, means for actuating said shaft to move said movable supports toward and away from said central support, means for locking said shaft against rotary movement, and a spring for holding said shaft in its locked position.

2. In a device of the character described, the combination, with a frame, a guide bar extending transversely of said frame, a sleeve mounted centrally of said guide bar and held against movement longitudinally thereof, other sleeves mounted on opposite sides of said first-mentioned sleeve and capable of movement longitudinally of said guide bar, and disks connected to said sleeve, of a rotatable shaft extending longitudinally of said frame from a point near said guide bar to a point near the rear of said frame, crank arms carried by said shaft and connected with said movable sleeves, and means for rotating said shaft to move said crank arms and adjust the position of said sleeves relatively to said centrally arranged sleeve, substantially as described.

3. In a device of the character described, the combination, with a frame, a guide bar extending transversely thereof, a sleeve mounted on said guide bar and held against movement longitudinally thereof, other sleeves mounted on said guide bar on opposite sides of said first-mentioned sleeve and adapted to be moved longitudinally of said guide bar, and disks connected to said sleeves, of a bearing lug supported on said guide bar, a shaft slidably mounted in said bearing lug extending to the rear of said frame and having a handle, crank arms carried by said shaft and connected to said movable sleeves, whereby the rotation of said shaft operates said crank arms to adjust said movable sleeves relatively to said first-mentioned sleeve, and means for locking said shaft in its adjusted position, substantially as described.

4. In a device of the character described, the combination, with a frame, and a plurality of disks supported from said frame, a part of said disks being slidably supported to move transversely of said frame, and a part being held against such transverse movement, other disks pivotally supported on the outside of said frame and movable toward and away from the first-mentioned disks, means for connecting said pivotally supported disks at points between the ends thereof to said slidably supported disks, whereby said pivotally supported disks are moved a greater distance than said slidably supported disks are moved, and means for moving said slidably supported disks, thereby simultaneously moving all of said movable disks.

5. In a device of the character described, the combination, with a frame, and a plurality of drag bars slidably mounted on said frame and movable transversely thereof, of other drag bars arranged on the opposite sides of said first mentioned drag bars and pivoted to fixed parts of said frame at points forward of the points of support of said first-mentioned drag bars and extending to points in the rear of said points of support, operating means extending between the first-mentioned drag bars and said pivoted drag bars at points between the ends of said pivoted drag bars, and means for actuating said first-mentioned drag bars, whereby all of said drag bars are simultaneously operated.

6. In a device of the character described, the combination, with a frame, a guide bar extending transversely thereof, a plurality of sleeves mounted on said guide bar, a part of said sleeves being adapted to move longitudinally of said guide bar and a part being held against such movement, and disks connected to said sleeves, of drag bars connected to said frame at a point forward of said guide bar, extending to the rear of said frame and provided at their rear ends with disks, and means for connecting each of said drag bars to one of said movable sleeves at a point intermediate the ends of said drag bars, whereby the movement of said sleeves and the disks carried thereby will actuate said drag bars to move the disks carried thereby a greater distance than the disks carried by said sleeves are moved, substantially as described.

7. In a device of the character described, the combination, with a frame, a guide bar extending transversely thereof, a sleeve mounted centrally of said guide bar and held against longitudinal movement thereon, other sleeves mounted on said guide bar on opposite sides of said central sleeve and movable longitudinally of said guide bar, disks connected to said sleeves, drag bars connected to said frame in front of said guide bar and extending to a point in the rear thereof, disks carried by the rear end of said drag bars, rods slidably connected at their opposite ends to said movable sleeves and said drag bars, and a spring confined between said drag bar and said movable sleeve, of a bearing supported by said guide bar, a shaft mounted in said bearing adapted to slide longitudinally thereof, crank arms carried by said shaft and connected to said movable sleeves, and means for rotating said shaft to actuate said crank arms to adjust the disks carried by said movable sleeves and by said drag bars toward and away from the disk carried by said central sleeve, substantially as described.

8. In a device of the character described, the combination, with a frame, and a plurality of disks supported therefrom, the outer disk on each side of said frame being held against vertical movement relatively thereto and all of the remaining disks being capable of free vertical movement, of means for adjusting said disks relatively one to the other.

9. In a device of the character described, the combination, with a frame, a plurality of drag bars pivotally supported in said frame, freely movable in a vertical plane and having disks at the free ends thereof, a single drag bar mounted near each side of said frame and held against vertical movement relatively thereto and having disks at the free ends thereof, of means for laterally adjusting said disks relatively one to the other.

10. In a device of the character described, the combination, with a frame, a plurality of drag bars pivotally supported in said frame, freely movable in a vertical plane and having disks at the free ends thereof, springs interposed between the free ends of said drag bars and said frame to control the vertical movement of said drag bars, a single drag bar mounted on each side of said frame, on opposite sides of said vertically movable drag bars, and held against vertical movement relatively thereto and having disks at the free ends thereof, of means for laterally adjusting said disks relatively one to the other.

11. In a device of the character described, the combination, with a frame, a row of disks supported therefrom and extending transversely thereto, the outermost disk on each side of said frame being held against vertical movement relatively to said frame, and all of the intermediate disks being capable of a free vertical movement relatively to said frame.

12. In a device of the character described, the combination, with a frame, a guide bar extending transversely of said frame, a plurality of sleeves journaled on said guide bar, part of said sleeves being held against longitudinal movement relatively to said guide bar and a part being capable of such longitudinal movement, disks connected to said sleeves, springs interposed between said disks and said frame, drag bars mounted on the outer sides of said frame and held against vertical movement relatively thereto and having disks mounted thereon, of means for adjusting said disks relatively one to the other, substantially as described.

13. In a device of the character described, the combination, with a frame, and a plurality of disks supported therefrom, the outermost disk on each side of said frame being held against vertical movement and the remaining disks being freely movable in a vertical plane, of a three point support for said frame, comprising said outermost disks on each side thereof, and a supporting wheel mounted in said frame forward of said disks.

In testimony whereof, I affix my signature in presence of two witnesses.

CHARLES H. PELTON.

Witnesses:
E. O. HAGAN,
EDWARD S. REED.